(12) United States Patent
Piaskowski et al.

(10) Patent No.: US 11,640,147 B2
(45) Date of Patent: May 2, 2023

(54) BUILDING MANAGEMENT SYSTEM WITH INTEGRATED CONTROL OF MULTIPLE COMPONENTS

(71) Applicant: Johnson Controls Technology Company, Auburn Hills, MI (US)

(72) Inventors: Ryan A. Piaskowski, Milwaukee, WI (US); Prashant P. Taralkar, Milwaukee, WI (US)

(73) Assignee: Johnson Controls Technology Company, Auburn Hills, MI (US)

( * ) Notice: Subject to any disclaimer, the term of this patent is extended or adjusted under 35 U.S.C. 154(b) by 0 days.

(21) Appl. No.: 17/373,308

(22) Filed: Jul. 12, 2021

(65) Prior Publication Data

US 2021/0341890 A1 Nov. 4, 2021

Related U.S. Application Data

(63) Continuation of application No. 16/406,575, filed on May 8, 2019, now Pat. No. 11,079,727, which is a continuation of application No. 15/604,300, filed on May 24, 2017, now Pat. No. 10,345,772.

(51) Int. Cl.
*G05B 15/02* (2006.01)
(52) U.S. Cl.
CPC ........ *G05B 15/02* (2013.01); *G05B 2219/163* (2013.01); *G05B 2219/25011* (2013.01); *G05B 2219/2642* (2013.01)
(58) Field of Classification Search
CPC .............. G05B 15/02; G05B 2219/163; G05B 2219/25011; G05B 2219/2642
See application file for complete search history.

(56) References Cited

U.S. PATENT DOCUMENTS

| 6,148,306 | A | * | 11/2000 | Seidl | G05B 19/0426 |
|---|---|---|---|---|---|
| 6,421,571 | B1 | | 7/2002 | Spriggs et al. | |
| 8,516,016 | B2 | * | 8/2013 | Park | G06F 16/2471 |
| | | | | | 726/1 |
| 2010/0058248 | A1 | | 3/2010 | Park | |
| 2011/0087650 | A1 | * | 4/2011 | Mackay | G05B 15/02 |
| | | | | | 707/769 |
| 2011/0087988 | A1 | * | 4/2011 | Ray | G06Q 50/16 |
| | | | | | 715/771 |

(Continued)

OTHER PUBLICATIONS

Search Report for International Application No. PCT/US2018/028634, dated Jul. 27, 2018, 13 pages.

*Primary Examiner* — Ronald D Hartman, Jr.
(74) *Attorney, Agent, or Firm* — Foley & Lardner LLP (57) ABSTRACT

A building management system including one or more circuits configured to receive a selection of an object associated with one of a building system, a piece of equipment, or a space of one or more building systems, one or more pieces of equipment, and/or one or more spaces of a building; determine the one or more pieces of equipment related to the object and/or the one or more spaces related to the object; and generate a graphical user interface illustrating (i) a relationship of the object with (a) the one or more pieces of equipment related to the object and/or (b) the one or more spaces related to the object and/or (ii) a control path between the object and (a) the one or more pieces of equipment related to the object and/or (b) the one or more spaces related to the object.

20 Claims, 8 Drawing Sheets

(56) References Cited

U.S. PATENT DOCUMENTS

| | | | |
|---|---|---|---|
| 2011/0088000 A1* | 4/2011 | Mackay | F24F 11/30 |
| | | | 715/853 |
| 2011/0115816 A1 | 5/2011 | Brackney | |
| 2011/0276886 A1 | 11/2011 | Hall et al. | |
| 2012/0022698 A1 | 1/2012 | Mackay | |
| 2012/0022700 A1 | 1/2012 | Drees et al. | |
| 2012/0166497 A1 | 6/2012 | Choi et al. | |
| 2012/0311525 A1 | 12/2012 | Xoual et al. | |
| 2013/0169681 A1 | 7/2013 | Rasane et al. | |
| 2014/0039685 A1 | 2/2014 | Blount et al. | |
| 2014/0049402 A1 | 2/2014 | Beaulieu et al. | |
| 2015/0005907 A1 | 1/2015 | Yamaoka et al. | |
| 2015/0293508 A1 | 10/2015 | Piaskowski et al. | |
| 2017/0286204 A1 | 10/2017 | DiBowski et al. | |
| 2017/0300193 A1 | 10/2017 | Ray et al. | |
| 2017/0329292 A1 | 11/2017 | Piaskowski et al. | |
| 2018/0259934 A1 | 9/2018 | Piaskowski et al. | |

\* cited by examiner

BUILDING MANAGEMENT SYSTEM WITH INTEGRATED CONTROL OF MULTIPLE COMPONENTS

CROSS-REFERENCE TO RELATED PATENT APPLICATIONS

This application is a Continuation of U.S. application Ser. No. 16/406,575, filed May 8, 2019, incorporated herein by reference in its entirety, which is a Continuation of U.S. application Ser. No. 15/604,300, filed May 24, 2017, incorporated herein by reference in its entirety.

BACKGROUND

The present disclosure relates generally to a user interface for viewing information relating to a building management system. A building management system (BMS) is, in general, a system of devices configured to control, monitor, and manage equipment in or around a building or building area. A BMS can include, for example, a heating, ventilation, and air conditioning (HVAC) system, a security system, a lighting system, a fire alerting system, any other system that is capable of managing building functions or devices, or any combination thereof.

Information about the BMS is typically accessed via a user interface generated by the BMS. A user may access the user interface via a user device such as a desktop, laptop, tablet, or mobile device. The user may generally access information about one or more spaces within the BMS, or one or more equipment within the BMS. For example, a user may view the current status of an area (e.g., occupancy, temperature, etc.), the current status of equipment (e.g., if equipment requires maintenance or replacement, if the equipment is malfunctioning), or any alarms or warning relating to the building or BMS.

Individual components within the BMS may have a wide-ranging impact on other components and various spaces in the BMS. For example, a change in the operation of a piece of equipment may impact multiple spaces and multiple BMS systems (e.g., an adjustment of a control strategy of an air handling unit of an HVAC system may negatively impact the performance of the HVAC system, causing additional energy to be used or a setpoint to not be reached). When such a change or other issue occurs in a BMS with a particular piece of equipment, space, or system, it may be difficult to diagnose the change or issue. Accordingly, it would be desirable to have systems and methods for generating a user interface that can provide users with information about how the operation of the various components of a BMS affect each other.

SUMMARY OF THE INVENTION

One implementation of the present disclosure relates to a building management system. The building management system includes one or more building systems including building equipment configured to serve one or spaces in a building. The building management system further includes a user device configured to display a user interface for monitoring and controlling the building systems, building equipment, and the one or more spaces. The building management system further includes a controller. The controller is configured to receive a user query via the user interface, the user query including a selection of a first object associated with one of a building system, a piece of equipment, or a space in the building. The controller is further configured to determine one or more pieces of equipment that are impacted by the first object. The controller is further configured to determine one or more spaces in the building that are impacted by the first object. The controller is further configured to generate a user interface illustrating the first object and a relationship of the first object with the one or more pieces of equipment impacted by the first object and the one or more spaces impacted by the first object.

Another implementation of the present disclosure relates to a building management system. The building management system includes one or more building systems including building equipment configured to serve one or spaces in a building. The building management system further includes a user device configured to display a user interface for monitoring and controlling the building systems, building equipment, and the one or more spaces. The building management system further includes a controller configured to identify a plurality of related building systems, building equipment, and one or more spaces. The controller includes a user input module configured to receive the selection of a first object associated with one of a building system, a piece of equipment, or a space in the building. The controller further includes an object relationship module configured to identify one or more pieces of equipment and one or more spaces impacted by the first object. The controller further includes a data retrieval module configured to determine one or more values associated with the first object and the identified one or more pieces of equipment and one or more spaces. The controller further includes a display module configured to generate a user interface illustrating the first object and a relationship of the first object with the one or more pieces of equipment impacted by the first object and the one or more spaces impacted by the first object.

Another implementation of the present disclosure relates to a method for configuring a user interface to be displayed on a user device. The user interface is configured to provide information about related components in a building management system. The method includes receiving a user query including a selection of a first object associated with one of a building system, a piece of equipment, or a space in a building. The method further includes determining one or more pieces of equipment that are impacted by the first object. The method further includes determining one or more spaces in the building that are impacted by the first object. The method further includes determining one or more values associated with the first object, the one or more pieces of equipment, and the one or more spaces. The method further includes generating a user interface illustrating the first object and a relationship of the first object with the one or more pieces of equipment impacted by the first object and the one or more spaces impacted by the first object.

DETAILED DESCRIPTION

Overview

Referring generally to the figures, systems and methods for providing a user interface for monitoring and controlling multiple components in a BMS are shown, according to exemplary embodiments. More particularly, the user interface described herein is configured to provide information about the relationship between various components in the BMS and the control logic associated with the components.

In a BMS, a supervisory level controller may generally implement supervisory level control for the various components of a BMS. The supervisory level controller may, for example, provide a general control strategy for multiple components of a BMS, without providing instructions for individual controllers for an individual component or piece of equipment. The relationship between the supervisory level control and the control of individual components or objects in a BMS may generally be inaccessible or not understandable due to the complexity of the BMS.

In some embodiments, a user may access such information via a user interface. For example, on the user interface, the user may select an object representing a component in the BMS (e.g., a piece of equipment, a building area, a subsystem, etc.). The object may include references to other objects in the BMS related to the object. The user may run a report that shows the relationship between the object and other objects. However, it may be difficult for a user to see how the high level control from the supervisory controller affects the object.

The user interface described herein may be configured to provide an interactive view that can be used to understand what is affecting an object in the BMS. The user interface may be used to identify software objects, user actions, and high-level control logic what affect the object. Further, the user interface may identify a control sequence and allow a user to traverse the control sequence at any level in the control "chain." In other words, the user may view how control logic impacts each individual object in the BMS impacted by the control logic. This allows the user to more clearly understand why a particular condition is occurring for an object in a BMS in response to the implementation of control logic.

In some implementations, the user interface provides an interactive view at an equipment level, allowing the user to see the impact of control logic for a piece of equipment and all other related pieces of equipment (i.e., all equipment impacted by the specific piece of equipment). In other implementations, the user interface provides an interactive view at a space level, allowing the user to see the impact of control logic for all components in a particular space.

At any level in the control sequence, the user interface may be configured to provide an indication of any user change that affects the object, equipment, or space represented at the level in the control sequence shown. This allows the user to gain a better understanding of how a user change affects a specific piece of equipment, or how a user change affects the overall control strategy in the BMS.

Building Management System and HVAC System

Figure 1:
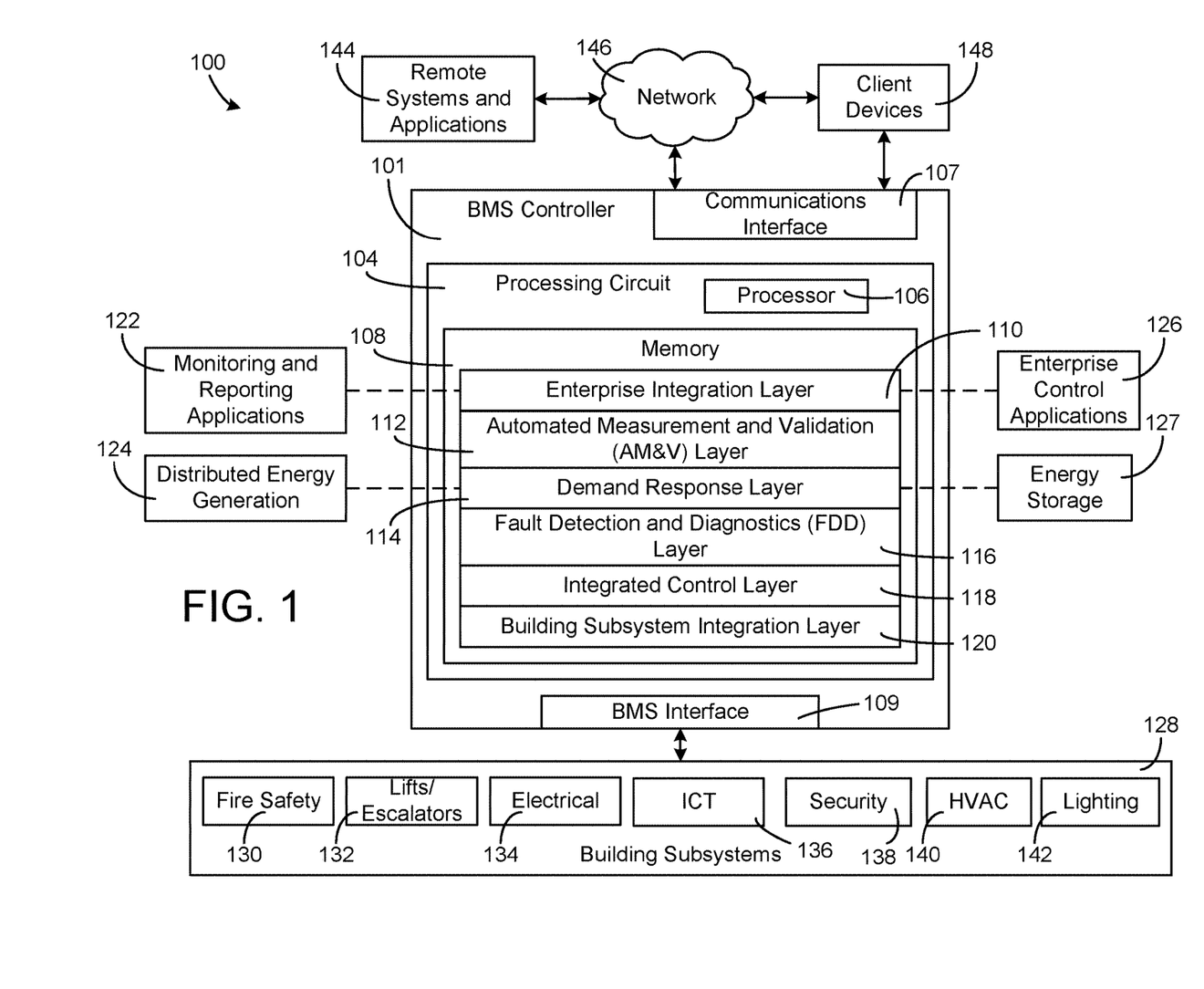
FIG. 1 is a high-level block diagram of a BMS including a BMS controller, according to some embodiments.

Referring now to FIG. 1, a block diagram of a BMS 100 is shown, according to an exemplary embodiment. BMS 100 is, in general, a system of devices configured to control, monitor, and manage equipment in or around a building or building area. A BMS can include, for example, a HVAC system, a security system, a lighting system, a fire alerting system, any other system that is capable of managing building functions or devices, or any combination thereof. BMS 100 is generally described in the present disclosure as serving a building or building area; in other embodiments BMS 100 may be configured to serve multiple buildings (e.g., a campus).

BMS controller 101 can include one or more computer systems (e.g., servers, supervisory controllers, subsystem controllers, etc.) that serve as system level controllers, application or data servers, head nodes, or master controllers for serving a building or building area. BMS controller 101 can communicate with multiple downstream building systems or subsystems (e.g., a HVAC system, a security system, a lighting system, etc.) via a communications link according to like or disparate protocols (e.g., LON, BACnet, etc.).

BMS 100 can be implemented in a building to automatically monitor and control various building functions. BMS 100 is shown to include a BMS controller 101 and a plurality of building subsystems 128. Building subsystems 128 are shown to include a fire safety subsystem 130, a lift/escalators subsystem 132, a building electrical subsystem 134, an information communication technology (ICT) subsystem 136, a security subsystem 138, a HVAC subsystem 140, and a lighting subsystem 142. In various embodiments, building subsystems 128 can include fewer, additional, or alternative subsystems. For example, building subsystems 128 can also or alternatively include a refrigeration subsystem, an advertising or signage subsystem, a cooking subsystem, a vending subsystem, a printer or copy service subsystem, or any other type of building subsystem that uses controllable equipment and/or sensors to monitor or control a building. In some embodiments, building subsystems 128 and more particularly HVAC subsystem 140 can include a waterside system and/or an airside system.

Each of building subsystems 128 can include any number of devices, controllers, and connections for completing its individual functions and control activities. HVAC subsystem 140 can include, for example, a chiller, a boiler, any number of air handling units, economizers, field controllers, supervisory controllers, actuators, temperature sensors, and other devices for controlling the temperature, humidity, airflow, or other variable conditions within a building. Lighting subsystem 142 can include any number of light fixtures, ballasts, lighting sensors, dimmers, or other devices configured to controllably adjust the amount of light provided to a building space. Security subsystem 138 can include occupancy sensors, video surveillance cameras, digital video recorders, video processing servers, intrusion detection devices, access control devices (e.g., card access, etc.) and servers, or other security-related devices.

BMS controller 101 is shown to include a communications interface 107 and a BMS interface 109. Communications interface 107 can facilitate communications between BMS controller 101 and external applications (e.g., monitoring and reporting applications 122, enterprise control applications 126, remote systems and applications 144, applications residing on client devices 148, etc.) for allowing user control, monitoring, and adjustment to BMS controller 101 and/or subsystems 128. Communications interface 107 can also facilitate communications between BMS controller 101 and client devices 148. BMS interface 109 can facilitate communications between BMS controller 101 and building subsystems 128 (e.g., HVAC, lighting security, lifts, power distribution, business, etc.).

Interfaces 107, 109 can be or include wired or wireless communications interfaces (e.g., jacks, antennas, transmitters, receivers, transceivers, wire terminals, etc.) for conducting data communications with building subsystems 128 or other external systems or devices. In various embodiments, communications via interfaces 107, 109 can be direct (e.g., locally wired or wireless communications) or via a communications network 146 (e.g., a WAN, the Internet, a cellular network, etc.). For example, interfaces 107, 109 can include an Ethernet card and port for sending and receiving data via an Ethernet-based communications link or network. In another example, the interfaces 107, 109 can include a Wi-Fi transceiver for communicating via a wireless communications network. In another example, one or both of interfaces 107, 109 can include cellular or mobile phone communications transceivers. In one embodiment, communications interface 107 is a power line communications interface and BMS interface 109 is an Ethernet interface. In other embodiments, communications interface 107 and BMS interface 109 are Ethernet interfaces or are the same Ethernet interface.

BMS controller 101 is shown to include a processing circuit 104 including a processor 106 and memory 108. Processing circuit 104 can be communicably connected to BMS interface 109 and/or communications interface 107 such that processing circuit 104 and the various components thereof can send and receive data via interfaces 107, 109. Processor 106 can be implemented as a general purpose processor, an application specific integrated circuit (ASIC), one or more field programmable gate arrays (FPGAs), a group of processing components, or other suitable electronic processing components.

Memory 108 (e.g., memory, memory unit, storage device, etc.) can include one or more devices (e.g., RAM, ROM, Flash memory, hard disk storage, etc.) for storing data and/or computer code for completing or facilitating the various processes, layers and modules described in the present application. Memory 108 can be or include volatile memory or non-volatile memory. Memory 108 can include database components, object code components, script components, or any other type of information structure for supporting the various activities and information structures described in the present application. According to an exemplary embodiment, memory 108 is communicably connected to processor 106 via processing circuit 104 and includes computer code for executing (e.g., by processing circuit 104 and/or processor 106) one or more processes described herein.

In some embodiments, BMS controller 101 is implemented within a single computer (e.g., one server, one housing, etc.). In various other embodiments BMS controller 101 can be distributed across multiple servers or computers (e.g., that can exist in distributed locations). Further, while FIG. 1 shows applications 122 and 126 as existing outside of BMS controller 101, in some embodiments, applications 122 and 126 can be hosted within BMS controller 101 (e.g., within memory 108).

Memory 108 is shown to include an enterprise integration layer 110, an automated measurement and validation (AM&V) layer 112, a demand response (DR) layer 114, a fault detection and diagnostics (FDD) layer 116, an integrated control layer 118, and a building subsystem integration later 120. Layers 110-120 can be configured to receive inputs from building subsystems 128 and other data sources, determine optimal control actions for building subsystems 128 based on the inputs, generate control signals based on the optimal control actions, and provide the generated control signals to building subsystems 128. The following paragraphs describe some of the general functions performed by each of layers 110-120 in BMS 100.

Enterprise integration layer 110 can be configured to serve clients or local applications with information and services to support a variety of enterprise-level applications. For example, enterprise control applications 126 can be configured to provide subsystem-spanning control to a graphical user interface (GUI) or to any number of enterprise-level business applications (e.g., accounting systems, user identification systems, etc.). Enterprise control applications 126 can also or alternatively be configured to provide configuration GUIs for configuring BMS controller 101. In yet other embodiments, enterprise control applications 126 can work with layers 110-120 to optimize building performance (e.g., efficiency, energy use, comfort, or safety) based on inputs received at interface 107 and/or BMS interface 109.

Building subsystem integration layer 120 can be configured to manage communications between BMS controller 101 and building subsystems 128. For example, building subsystem integration layer 120 can receive sensor data and input signals from building subsystems 128 and provide output data and control signals to building subsystems 128. Building subsystem integration layer 120 can also be configured to manage communications between building subsystems 128. Building subsystem integration layer 120 translates communications (e.g., sensor data, input signals, output signals, etc.) across a plurality of multi-vendor/multi-protocol systems.

Demand response layer 114 can be configured to optimize resource usage (e.g., electricity use, natural gas use, water use, etc.) and/or the monetary cost of such resource usage in response to satisfy the demand of a building. The optimization can be based on time-of-use prices, curtailment signals, energy availability, or other data received from utility providers, distributed energy generation systems 124, from energy storage 127, or from other sources. Demand response layer 114 can receive inputs from other layers of BMS controller 101 (e.g., building subsystem integration layer 120, integrated control layer 118, etc.). The inputs received from other layers can include environmental or sensor inputs such as temperature, carbon dioxide levels, relative humidity levels, air quality sensor outputs, occupancy sensor outputs, room schedules, and the like. The inputs can also include inputs such as electrical use (e.g., expressed in kWh), thermal load measurements, pricing information, projected pricing, smoothed pricing, curtailment signals from utilities, and the like.

According to an exemplary embodiment, demand response layer 114 includes control logic for responding to the data and signals it receives. These responses can include communicating with the control algorithms in integrated control layer 118, changing control strategies, changing setpoints, or activating/deactivating building equipment or subsystems in a controlled manner. Demand response layer 114 can also include control logic configured to determine when to utilize stored energy. For example, demand response layer 114 can determine to begin using energy from energy storage 127 just prior to the beginning of a peak use hour.

In some embodiments, demand response layer 114 includes a control module configured to actively initiate control actions (e.g., automatically changing setpoints) which minimize energy costs based on one or more inputs representative of or based on demand (e.g., price, a curtailment signal, a demand level, etc.). In some embodiments, demand response layer 114 uses equipment models to determine an optimal set of control actions. The equipment models can include, for example, thermodynamic models describing the inputs, outputs, and/or functions performed by various sets of building equipment. Equipment models can represent collections of building equipment (e.g., subplants, chiller arrays, etc.) or individual devices (e.g., individual chillers, heaters, pumps, etc.).

Demand response layer 114 can further include or draw upon one or more demand response policy definitions (e.g., databases, XML, files, etc.). The policy definitions can be edited or adjusted by a user (e.g., via a graphical user interface) so that the control actions initiated in response to demand inputs can be tailored for the user's application, desired comfort level, particular building equipment, or based on other concerns. For example, the demand response policy definitions can specify which equipment can be turned on or off in response to particular demand inputs, how long a system or piece of equipment should be turned off, what setpoints can be changed, what the allowable set point adjustment range is, how long to hold a high demand set-point before returning to a normally scheduled set-point, how close to approach capacity limits, which equipment modes to utilize, the energy transfer rates (e.g., the maximum rate, an alarm rate, other rate boundary information, etc.) into and out of energy storage devices (e.g., thermal storage tanks, battery banks, etc.), and when to dispatch on-site generation of energy (e.g., via fuel cells, a motor generator set, etc.).

Integrated control layer 118 can be configured to use the data input or output of building subsystem integration layer 120 and/or demand response layer 114 to make control decisions. Due to the subsystem integration provided by building subsystem integration layer 120, integrated control layer 118 can integrate control activities of the subsystems 128 such that the subsystems 128 behave as a single integrated supersystem. In an exemplary embodiment, integrated control layer 118 includes control logic that uses inputs and outputs from a plurality of building subsystems to provide greater comfort and energy savings relative to the comfort and energy savings that separate subsystems could provide alone. For example, integrated control layer 118 can be configured to use an input from a first subsystem to make an energy-saving control decision for a second subsystem. Results of these decisions can be communicated back to building subsystem integration layer 120.

Integrated control layer 118 is shown to be logically below demand response layer 114. Integrated control layer 118 can be configured to enhance the effectiveness of demand response layer 114 by enabling building subsystems 128 and their respective control loops to be controlled in coordination with demand response layer 114. This configuration may advantageously reduce disruptive demand response behavior relative to conventional systems. For example, integrated control layer 118 can be configured to assure that a demand response-driven upward adjustment to the set-point for chilled water temperature (or another component that directly or indirectly affects temperature) does not result in an increase in fan energy (or other energy used to cool a space) that would result in greater total building energy use than was saved at the chiller.

Integrated control layer 118 can be configured to provide feedback to demand response layer 114 so that demand response layer 114 checks that constraints (e.g., temperature, lighting levels, etc.) are properly maintained even while demanded load shedding is in progress. The constraints can also include set-point or sensed boundaries relating to safety, equipment operating limits and performance, comfort, fire codes, electrical codes, energy codes, and the like. Integrated control layer 118 is also logically below fault detection and diagnostics layer 116 and automated measurement and validation layer 112. Integrated control layer 118 can be configured to provide calculated inputs (e.g., aggregations) to these higher levels based on outputs from more than one building subsystem.

Automated measurement and validation (AM&V) layer 112 can be configured to verify that control strategies commanded by integrated control layer 118 or demand response layer 114 are working properly (e.g., using data aggregated by AM&V layer 112, integrated control layer 118, building subsystem integration layer 120, FDD layer 116, or otherwise). The calculations made by AM&V layer 112 can be based on building system energy models and/or equipment models for individual BMS devices or subsystems. For example, AM&V layer 112 can compare a model-predicted output with an actual output from building subsystems 128 to determine an accuracy of the model.

Fault detection and diagnostics (FDD) layer 116 can be configured to provide on-going fault detection for building subsystems 128, building subsystem devices (i.e., building equipment), and control algorithms used by demand response layer 114 and integrated control layer 118. FDD layer 116 can receive data inputs from integrated control layer 118, directly from one or more building subsystems or devices, or from another data source. FDD layer 116 can automatically diagnose and respond to detected faults. The responses to detected or diagnosed faults can include providing an alert message to a user, a maintenance scheduling system, or a control algorithm configured to attempt to repair the fault or to work-around the fault.

FDD layer 116 can be configured to output a specific identification of the faulty component or cause of the fault (e.g., loose damper linkage) using detailed subsystem inputs available at building subsystem integration layer 120. In other exemplary embodiments, FDD layer 116 is configured to provide "fault" events to integrated control layer 118 which executes control strategies and policies in response to the received fault events. According to an exemplary embodiment, FDD layer 116 (or a policy executed by an integrated control engine or business rules engine) can shut-down systems or direct control activities around faulty devices or systems to reduce energy waste, extend equipment life, or ensure proper control response.

FDD layer 116 can be configured to store or access a variety of different system data stores (or data points for live data). FDD layer 116 can use some content of the data stores to identify faults at the equipment level (e.g., specific chiller, specific AHU, specific terminal unit, etc.) and other content to identify faults at component or subsystem levels. For example, building subsystems 128 can generate temporal (i.e., time-series) data indicating the performance of BMS 100 and the various components thereof. The data generated by building subsystems 128 can include measured or calculated values that exhibit statistical characteristics and provide information about how the corresponding system or process (e.g., a temperature control process, a flow control process, etc.) is performing in terms of error from its set-point. These processes can be examined by FDD layer 116 to expose when the system begins to degrade in performance and alert a user to repair the fault before it becomes more severe.

(a) User Interface System

Figure 2:
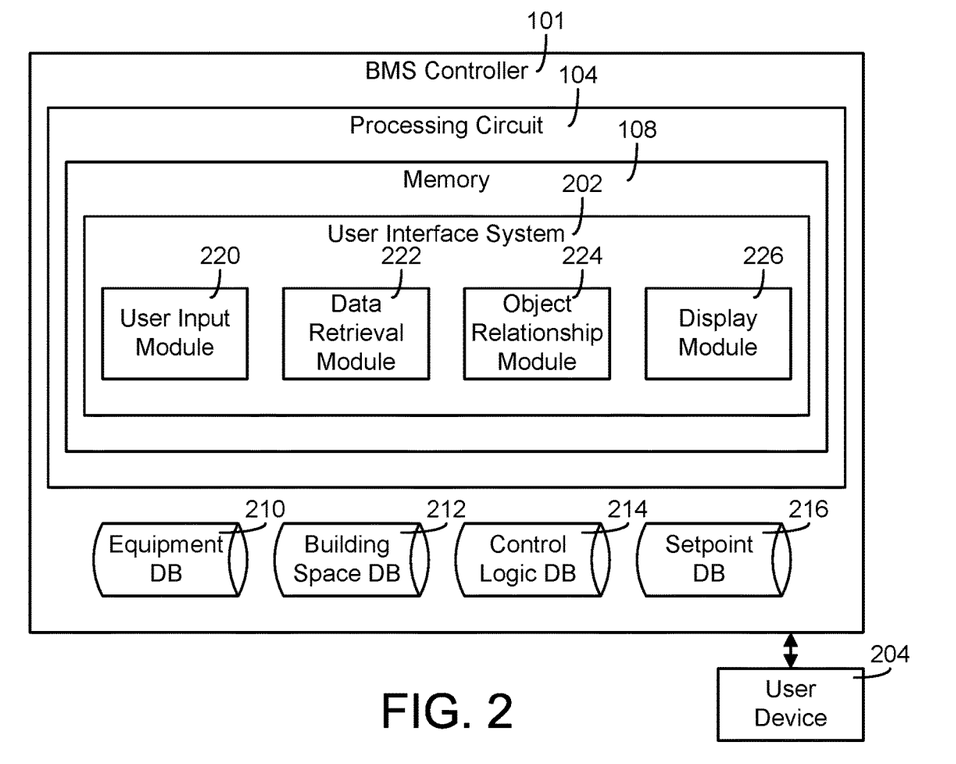
FIG. 2 is a detailed block diagram of the BMS controller of FIG. 1 and more particularly a user interface system of the BMS controller, according to some embodiments.

Referring now to FIG. 2, a detailed block diagram of BMS controller 101 is shown in greater detail. More particularly, memory 108 of BMS controller 101 is shown to include a user interface system 202. While FIG. 2 describes user interface system 202 in greater detail, it should be understood that BMS controller 101 and memory 108 may further include any number of managers, sub-systems, and modules, and may provide various BMS features for a building or building area beyond what is described in the present disclosure.

User interface system 202 may generally be configured to generate an interactive user interface for display on a user device 204. The interactive user interface may generally display information relating to a particular object (e.g., a piece of equipment of a building subsystem, a building area, etc.) and the relationship between the object and other objects in the building. In the present disclosure, the term "object" is used to describe a particular piece of equipment, building area, or other individual aspect associated with a BMS (e.g., BMS 100); and it should be understood that the term is not limiting towards the type of information associated with the object.

User device 204 may be, for example, a workstation, a desktop, a laptop, a tablet, or a mobile device. In various embodiments, user device 204 may include a keyboard, a mouse, a touchscreen, or any other component for allowing the user to provide an input to user interface system 202. User device 204 may include any type of display, and user interface system 202 may generally be configured to generate a user interface compatible with the type of user device 204 wishing to access the user interface.

BMS controller 101 is shown to include various databases storing information relating to the various components of BMS 100. In some embodiments, the databases may be located and maintained within BMS controller 101; in other embodiments, the databases may be located remotely from BMS controller 101, and may be accessed by BMS controller 101 via a wired or wireless connection. Further, while each database shown in FIG. 2 is described as a single database, it should be understood that BMS 100 may include multiple databases storing the same type of information. For example, equipment information may be stored in multiple equipment databases instead of a single equipment database, and so forth. BMS 100 may be configured to maintain the various databases in any manner. For example, BMS 100 may maintain the control logic database to ensure that changes or updates to the high level control logic of BMS 100 are stored. Further, while databases are shown in FIG. 2, in other embodiments BMS controller 101 may retrieve the data described from any other type of source.

BMS controller 101 may include an equipment database 210 storing information relating to individual pieces of equipment in BMS 100. Equipment database 210 may store, for each piece of equipment, one or more subsystems to which the piece of equipment belongs, along with information about the functionality and operating parameters of the equipment. The information stored in equipment database 210 may further include relationships between different pieces of equipment. For example, for a given piece of equipment for a building subsystem, the other equipment in the building subsystem may be identified. When information about the equipment is then retrieved (i.e., by user interface system 202), the information may include the relationship the equipment has with other equipment in BMS 100.

BMS controller 101 may include a building space database 212 storing information relating to individual building spaces in the building. Building space database 212 may store information identifying each room in a building, each floor in a building, and multiple rooms, floors, or areas which are related to one another. For example, multiple rooms in a building may share a common area, the environment in a first room may impact the environment in a second room, and so forth. Building space database 212 may store information about each building area in a building and how the building areas are related.

BMS controller 101 may include a control logic database 214 storing information relating to the control of the various equipment and subsystems in BMS 100. Control logic database 214 may store, for example, high level control logic for BMS 100. The high level control logic may relate to a general strategy for operation of equipment in BMS 100. For example, BMS 100 may implement an energy savings strategy and may provide control logic for the various building subsystems to cause the building subsystems to use less power during operation. As another example, BMS 100 may implement control logic for a specific building subsystem (i.e., control logic to specifically control the temperature within the building via the HVAC system). Referring generally to the present disclosure, "high level control logic" may relate to control logic for all equipment in a building, for a particular subset of equipment in a building, or one or more specific building subsystems, or any combination thereof. In various embodiments, one or more BMS controllers may update the control logic for BMS 100 based on the current conditions and/or user input, and user interface system 202 may retrieve the updated control logic via control logic database 214 or via any other method.

BMS controller 101 may include a setpoint database 216 storing information relating to one or more setpoints for one or more building areas or spaces in the building. For example, setpoint database 216 may include one or more settings for a space (e.g., a temperature or other condition to be maintained in a building area). Setpoint database 216 may further include one or more settings for the operation of one or more pieces of equipment in BMS 100.

User interface system 202 is shown to include various modules for creating and updating an interactive user interface to be provided to user device 204. User interface system 202 is shown to include a user input module 220 configured to receive a user input via user device 204 and to interpret the input. For example, the user input may relate to the selection of a specific piece of equipment or specific building area to be displayed on the user interface. User input module 220 may be configured to identify the object associated with the user input (e.g., an object representing the piece of equipment or building area specified) and to identify other objects related to the object. The user may be configured to provide the user input via any type of selection (e.g., the selection of a link on the user interface, a selection from a menu, a text entry, a selection via a touch on a touchscreen, etc.).

User interface system 202 is further shown to include a data retrieval module 222. Based on the user input (as described in user input module 220), data retrieval module 222 may identify other pieces of equipment, and/or other building areas related to the identified object. Data retrieval module 222 may then retrieve data relevant to each of the equipment and spaces from databases 210-216 and other sources. Data retrieval module 222 may further retrieve data relating to a current status of the equipment and spaces. For example, data retrieval module 222 may retrieve performance data for a piece of equipment, the current environment (e.g., temperature) in a building area, and the like.

User interface system 202 is further shown to include an object relationship module 224. Using the identified object and the identified related equipment and spaces, object relationship module 224 may determine a relationship between the various components. Further, using data retrieved by data retrieval module 222, object relationship module 224 may determine which components have an impact on particular data points. For example, for a temperature data point for a building area, object relationship module 224 may identify all equipment used in maintaining the temperature in the building area.

Figure 3:
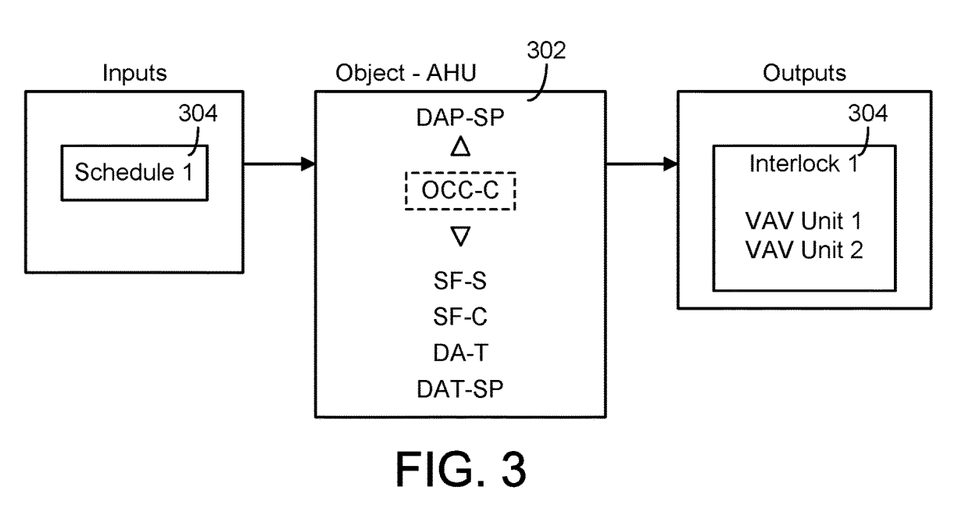
FIG. 3 is a block diagram illustrating a process which can be performed by the BMS controller of FIG. 1 for determining a relationship between an object and other components in a BMS, according to some embodiments.

Referring also to FIG. 3, a block diagram illustrating an example activity of object relationship module 224 is shown. In the example of FIG. 3, the object 302 selected by the user is an air handling unit (AHU) of an HVAC system. The AHU may be controlled via a control strategy that changes the air temperature in a building area over time.

Data retrieval module 222, based on the selection of object 302, may retrieve information, such as a schedule 304. Schedule 304 may indicate a desired temperature level for a building area over time. Schedule 304 may be set based on a general control strategy for a building, and may impact any number of building areas. For example, schedule 304 may be a schedule for a single piece of equipment, for all equipment in a building area, or for all areas in a building. Therefore, the information retrieved by data retrieval module 222 may include an indication that a change in the schedule may impact just a single building area or multiple building areas.

Object relationship module 224 may identify one or more values or setpoints which may be impacted by the AHU. For example, object relationship module 224 may identify a current temperature in a building area that the AHU is partially responsible for maintaining. Further, object relationship module 224 may identify a setpoint to be achieved in a building area that the AHU is partially responsible for maintaining. In the example of FIG. 3, object relationship module 224 has identified a duct static pressure setpoint (DAP-SP) and a discharge air temperature setpoint (DAT-SP) that the HVAC unit including the AHU is in charge of reaching. Further, object relationship module 224 has identified values relating to the current status of a building area the HVAC unit serves, such as the current occupancy status (OCC-C), supply fan status (SF-S) and discharge air temperature (DA-T). Further, object relationship module 224 has identified a command relating to the control of a supply fan of the AHU (SF-C). The example values and setpoints shown in FIG. 3 are not limiting; any number of values and setpoints may be identified.

Object relationship module 224, using the information and the identified values and setpoints, may provide an output 306 specifying one or more equipment, setpoints, or control strategies impacted by the object. In other words, object relationship module 224 identifies the components of BMS 100 that are impacted by the performance of the AHU. In the example shown in FIG. 3, object relationship module 224 has identified an interlock condition between two VAV units of an HVAC system. Since VAV units are generally configured to alter the air flow in a building area to maintain a temperature, a change in operation of the AHU may cause the VAV units to have to alter their operation to compensate. Further, the altering of the operation of one VAV unit may cause the operation of the second VAV unit to also be altered to maintain a temperature. The interlock condition defines a conditional control over one or more components based on the activity of other components.

User interface system 202 is further shown to include a display module 226 configured to generate the interactive user interface on user device 204. Display module 226 may generally be configured to provide a layout identifying the object selected by the user and objects for associated equipment and spaces. Display module 226 may show the link between the various components in any way. In various embodiments, the interactive user interface may make each object selectable in any way (e.g., via a link, button, menu option, via touchscreen, etc.).

Figure 4A:
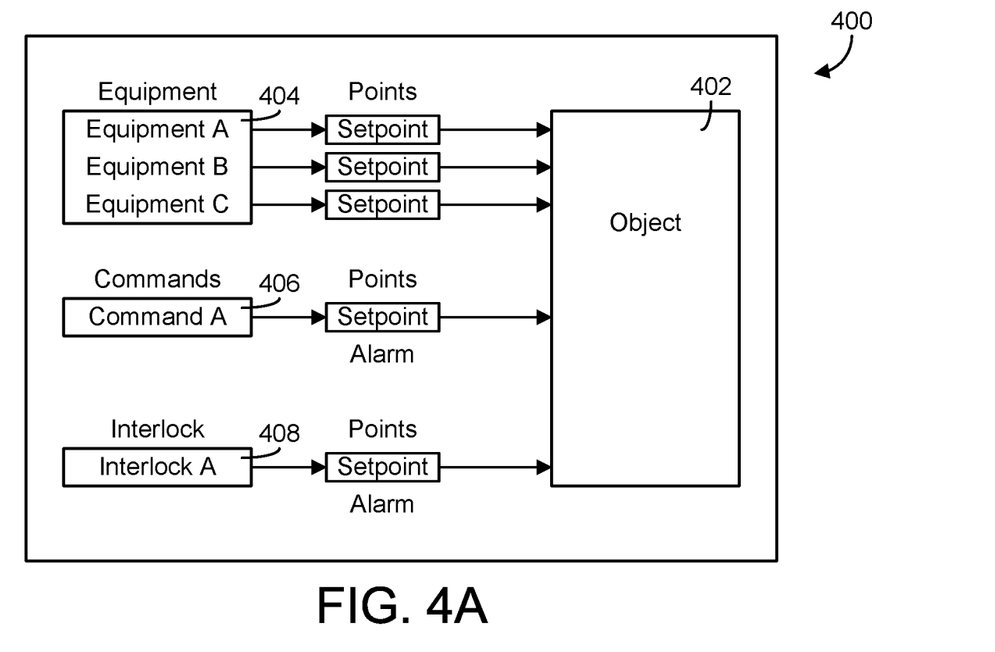
FIG. 4A is an example user interface layout that may be generated by the user interface system of FIG. 2, according to some embodiments.

Display module 226 may be configured to generate different layouts for different types of user devices. For example, referring to FIGS. 4A-B, two example generic layouts are illustrated. For a desktop or workstation with a relatively large monitor display, a layout similar to that shown in FIG. 4A may be generated. Layout 400 includes a main block 402 representing the object selected by the user. Layout 400 further includes blocks 404 representative of the multiple pieces of equipment, and of one or more setpoints associated with the operation of each equipment. Layout 400 may further include blocks 406 illustrating one or more commands that may control the operation of the object (e.g., control logic). Layout 400 may further include blocks 408 representative of one or more interlock conditions (e.g., features that makes the state of two different functions or components within BMS 100 mutually dependent on each other). The relationship between the various components and the object may be illustrated in any way. For example, in FIG. 4A, arrows are shown indicating that the various components impact the object.

Figure 4B:
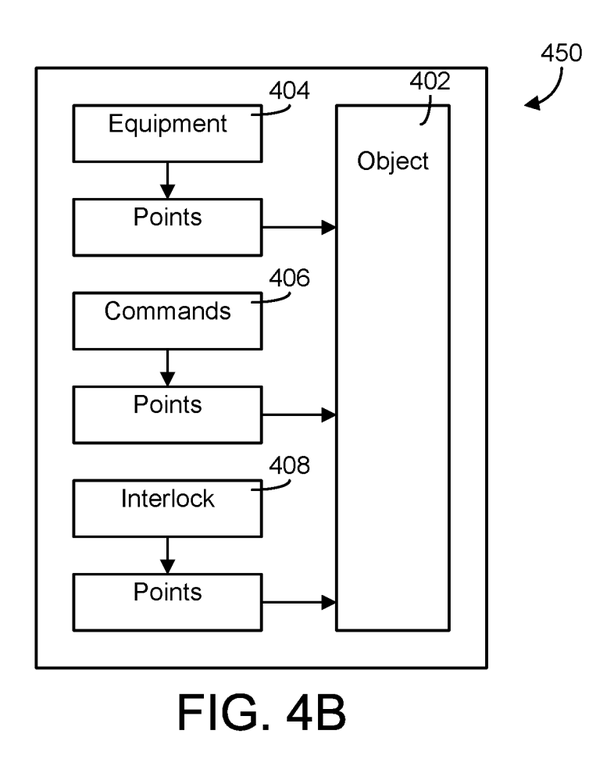
FIG. 4B is an example user interface layout for a mobile device that may be generated by the user interface system of FIG. 2, according to some embodiments.

For a mobile device or other device with a relatively small display, a layout similar to that shown in FIG. 4B may be generated. Layout 450 may include the same general information as described with respect to FIG. 4A, compacted into a smaller area on the screen. It should be understood that the various components displayed on the user interface may be organized in any way.

As yet another example of an output from display module 226, the user interface may have a similar structure as that shown in FIG. 3. The user interface may display the input and output (e.g., the data and other information identified as impacting the object, and the components affected by the object). The user interface may further display values for parameters the object is responsible for maintaining, and setpoints that the object is responsible for reaching.

Figure 5:
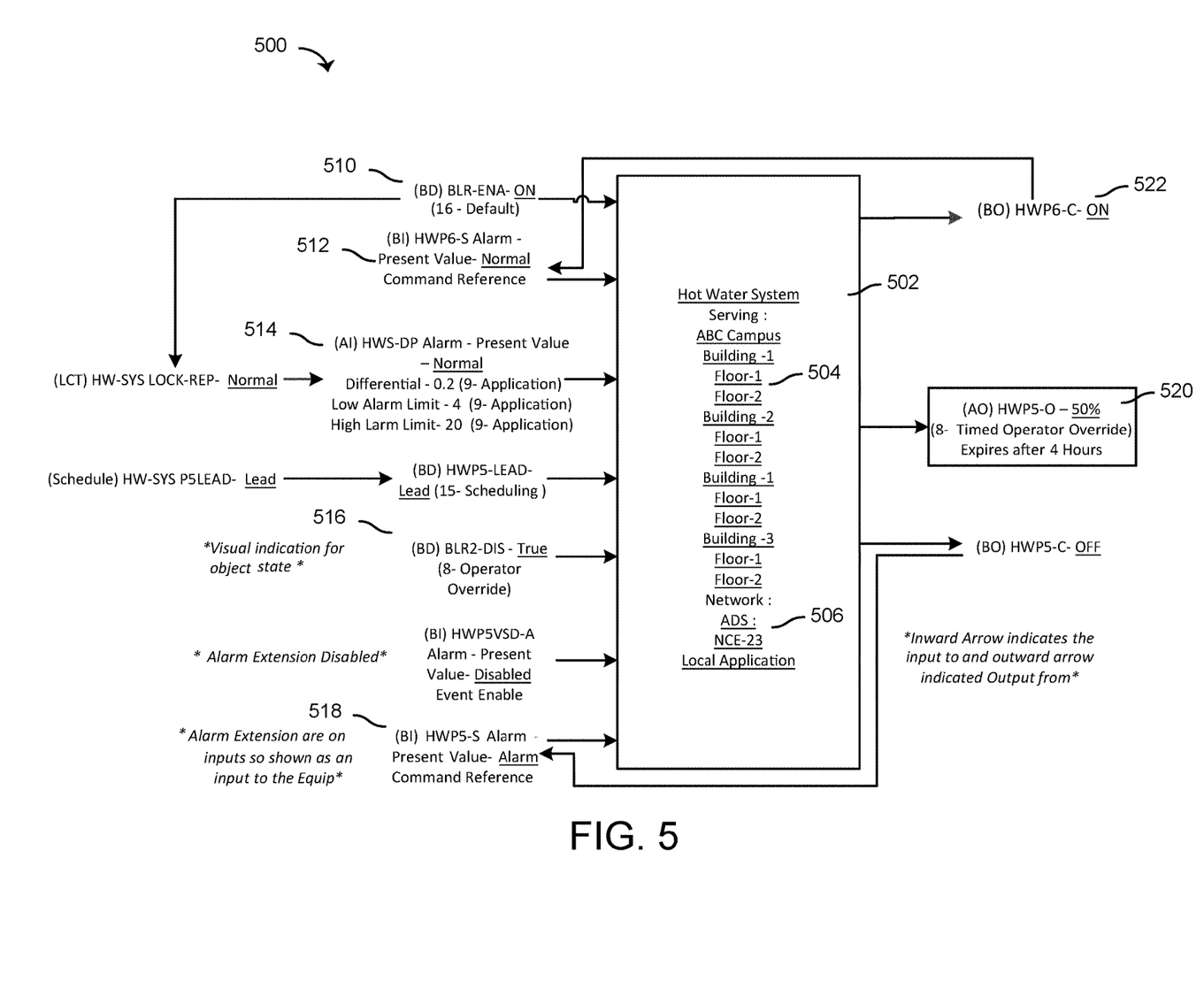
FIG. 5 is an example user interface for a hot water system that can be generated by the user interface system of FIG. 2, according to some embodiments.
Figure 6:
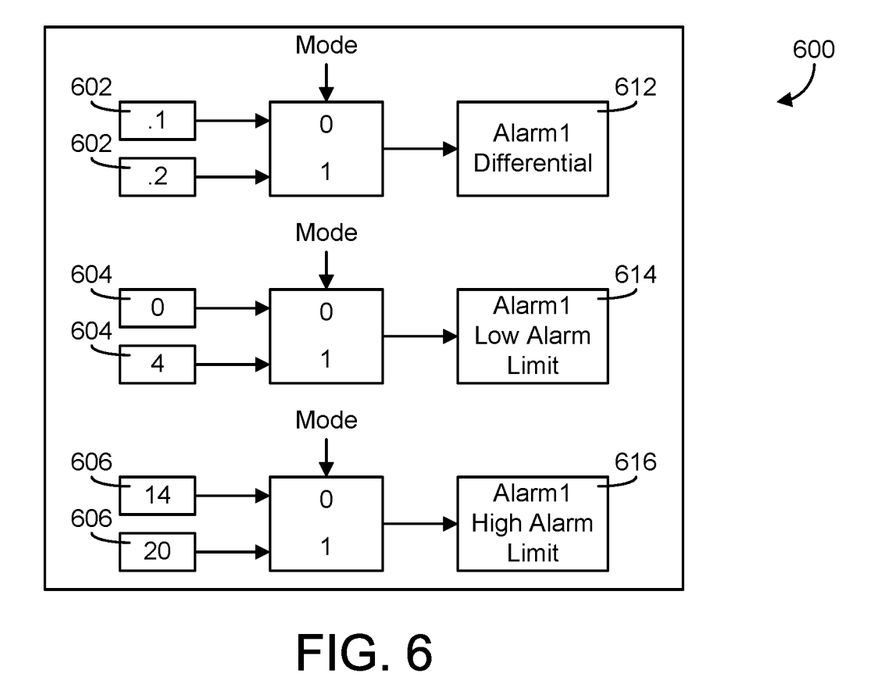
FIG. 6 is an example user interface displaying a logic connector tool for the hot water system of FIG. 5, according to some embodiments.
Figure 7:
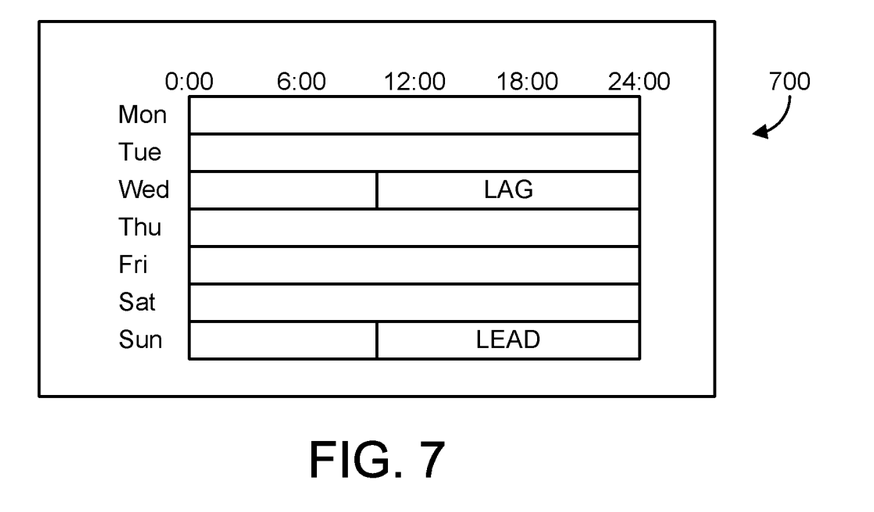
FIG. 7 is an example user interface displaying scheduling information for the hot water system of FIG. 5, according to some embodiments.

Referring generally to FIGS. 5-7, example interactive user interfaces that can be generated by display module 226 and provided to a user device 204 are shown in greater detail. Referring to FIG. 5, a user interface 500 is shown that may be generated for a hot water system. In the example of FIG.

5, the object selected by the user is the hot water system, and all components related to the hot water heater are illustrated on user interface 500.

Object 502 representing the hot water system is shown to display a list of spaces served by the hot water system. Object 502 may identify multiple spaces 504. Object 502 may further identify multiple networks 506, i.e., one or more networks to which the hot water system is connected. Each individual space 504 and network 506 are shown to be selectable via link. Upon selection of a space or network, user interface 500 may be configured to create an object for the space or network and to display all components affected by the space or network. This allows the user to navigate from component to component via user interface 500.

User interface 500 further illustrates various components (e.g., equipment, setpoints, etc.) that impact the performance of the hot water system. For example, a boiler 510 of the hot water system is shown as enabled (BLR-ENA) with a low priority level (16). Boiler 510 is an example of a piece of equipment associated with the hot water system. A hot water pump status 512 (HWP6-S) is shown, with an alarm generated based on a current value 522. A hot water supply differential pressure (HWS-DP) value 514 is shown, also with an alarm generated based on the current value. Status 512 and value 514 are example values of current conditions that the hot water system may be responsible for maintaining or monitoring.

Further, a boiler discharge value 516 (BLR2-DIS) is shown as true. In this example, an operator has provided an override value to BMS 100 based on the status of the boiler. User interface 500 may indicate that the operator has provided the override value, and that the override value has an impact on the status of the hot water system.

Further, a second hot water pump status 518 is shown (HWP5-S), with an alarm generated based on a current value. User interface 500 may highlight object 518 on the screen to further illustrate its impact on the hot water heater. User interface 500 may be configured to highlight each object on the screen in various ways (e.g., via shading, coloring, different line weights or dashes, different shapes, different text, etc.).

In the embodiment of FIG. 5, a user may edit the value or setpoint associated with any of the displayed object. For example, the user may choose to ignore a current alarm status of object 512. When the user provides such an indication, user interface 500 may be configured to update to show the impact of the alarm on the hot water system, and on the other components (objects) associated with the hot water system. Further, if the user changes any value, user interface 500 may update appropriately.

User interface 500 further illustrates an output 520 of the hot water system (HWP5-O). As the user modifies a value, setting, or control strategy, user interface 500 may update to show an updated output 520, allowing the user to see how a change in one component impacts an output of the hot water system.

Referring to FIG. 6, a logic connector tool (LCT) 600 for the hot water system of FIG. 5 is shown. LCT 600 is an example user interface that can be provided via the systems and methods described herein. LCT 600 may generally be used to connect current data and values in a BMS component with logic or decisions blocks that impact the control strategy for a BMS system (e.g., one or more systems or subsystems within BMS 100). In other words, using LCT 600, a user may configure a control strategy for a BMS system and see the impact of current data and values on the control strategy. In the embodiment of FIG. 6, data 602 representative of a differential between two data points of the hot water system are chosen by the user, and a differential alarm 612 may be activated if the values reach a threshold. Similarly, data 604 and 606 may be specified by a user to correspond with a low alarm limit 614 and high alarm limit 616. When specifying the values to use, or changing the values, the user may be able to see when an alarm is activated, and the impact of the alarm on the performance of the hot water system.

Referring to FIG. 7, a schedule interface 700 for the hot water system of FIG. 5 is shown. As described above, the user may access schedule information for an equipment, space, or system. The schedule may indicate a control strategy over time for the equipment, space, or system. The user, via schedule interface 700, may be able to select a specific time or interval and may be provided with information about the impact of the control strategy at the time or interval. More specifically, the user may be able to view the impact on related equipment and spaces over time. The user may further be able to adjust a schedule (e.g., changing a setpoint for a given period of time), and to see the impact of the change on related equipment and spaces.

Figure 8:
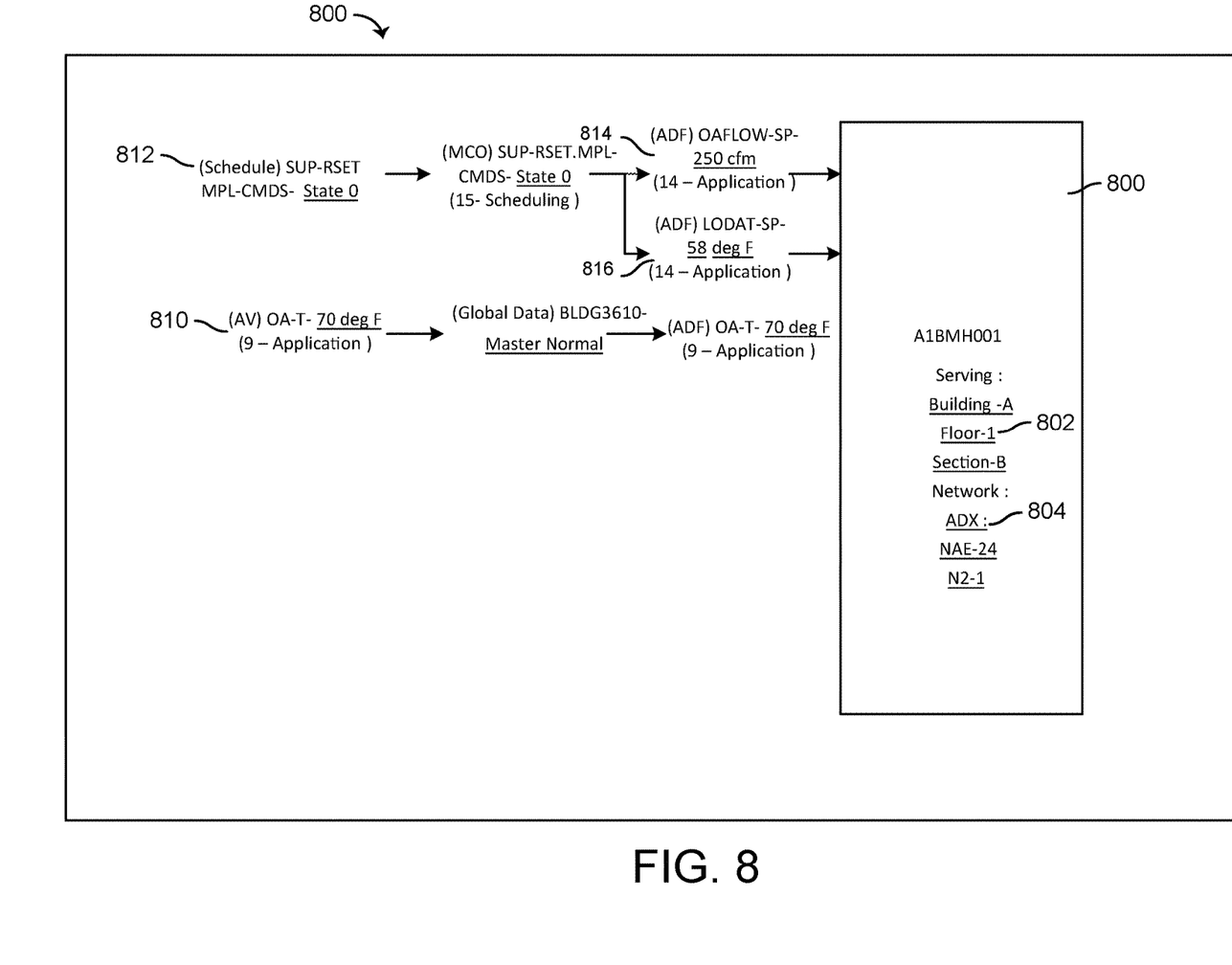
FIG. 8 is an example user interface for an air handling unit that can be generated by the user interface system of FIG. 2, according to some embodiments.

Referring now to FIG. 8, an example user interface 800 is shown. In the example of FIG. 8, the user has chosen an AHU, shown as object 802. Multiple spaces 804 whose environment is affected by the AHU are shown listed in object 802, along with multiple networks 806 connected to the unit. Similarly to FIG. 5, the user may be able to select a space to cause the user interface to generate a view with the selected space as the object.

As the AHU is a piece of equipment, data may be retrieved for display on user interface 800 that may impact the performance or operation of the AHU. For example, outside air temperature 810 (OA-T) is shown as an identified data point relevant to the AHU. The outside air temperature may generally impact the control strategy for the AHU, as the temperature may impact the decision on whether the AHU needs to provide cooled or heated air to a building area. Outside air temperature 810 (shown as 70°) is shown associated with a building area (BLDG3610).

As shown in FIG. 8, a supervisory controller reset function 812 (SUP-RSET) is identified as impacting the AHU. Function 812 may be a function, for example, entered by a user, and user interface 800 in response may display an impact of the function on the AHU operation. Function 812 may cause the supervisory controller to reset based on a schedule. The reset may cause a change in status of the AHU. For example, an outside air flow amount 814 is identified (250 cubic feet per minute, or cfm), along with the temperature 816 of the air flow) (58°. This outside air flow 814 may occur at the time of reset of the controller, impacting the performance of the AHU. When user interface 800 is loaded for the user and the reset function 812 is selected by the user, user interface 800 is configured to show the data, values, and setpoints impacted by the function, along with the eventual impact on the AHU.

Figure 9:
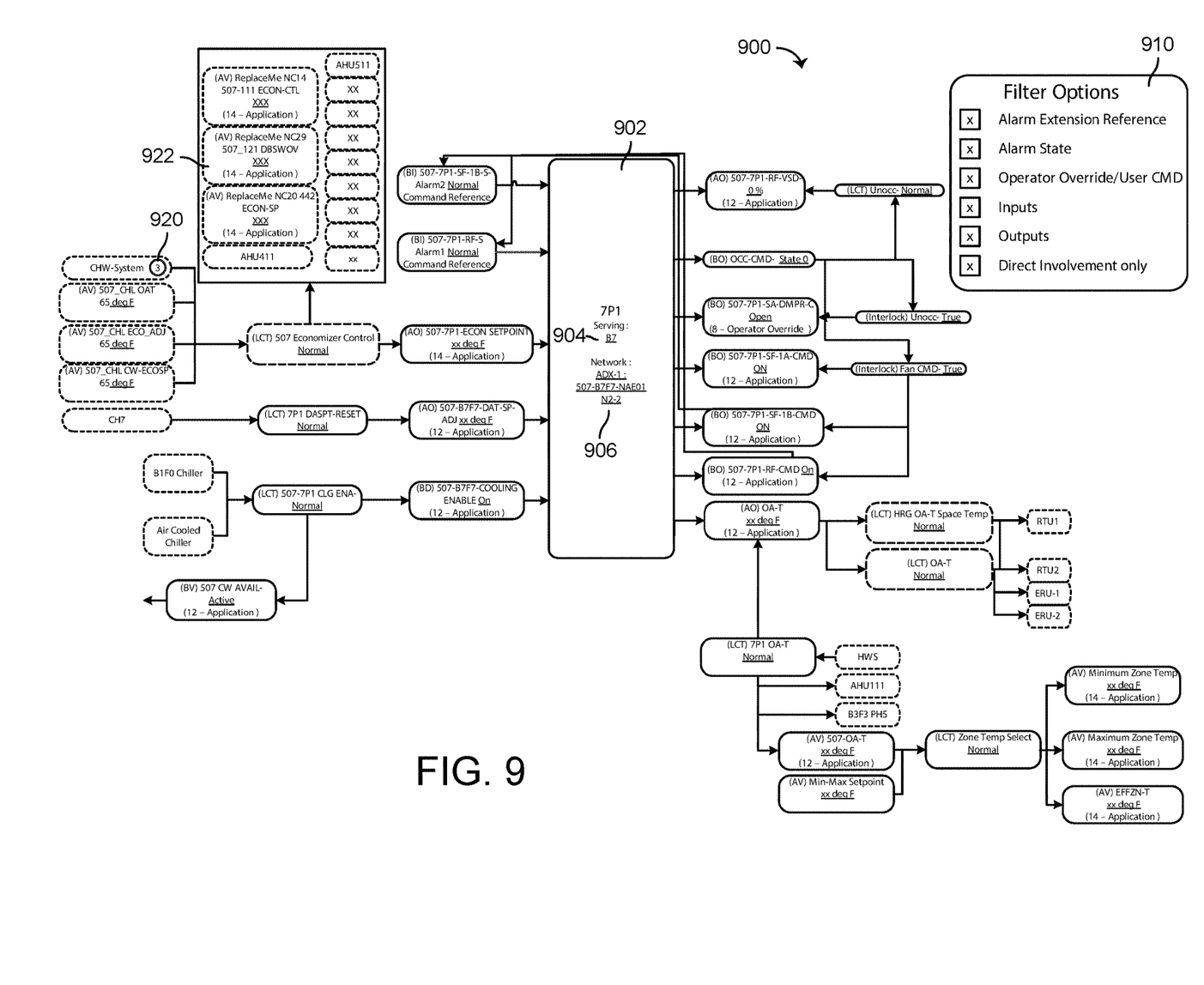
FIG. 9 is another example user interface for an air handling unit that can be generated by the user interface system of FIG. 2, according to some embodiments.

Referring to FIG. 9, another example user interface 900 is shown for the AHU example. As described above, while navigating a user interface generated for a first object, the user may select a second object. Upon selection of the second object, the user interface may be updated or changed to feature the second object. In some embodiments, the user interface is updated to include only objects associated with the second object. In some embodiments, the user interface is update to include object associated with either the first object or second object. In the example of FIG. 9, the user may have started out viewing information for a network automation engine (NAE) (507-B7F7-NAE01, shown in object 902), then clicked on an equipment (N2-2, also shown in object 902). The user may have then clicked on a AHU object (shown as 7P1 in object 902). As a result, all objects related to the NAE and equipment are shown in user interface 900 in addition to the AHU.

Referring further to FIG. 9, a filter option 910 is shown in greater detail. In some embodiments, the user may be able to filter objects shown in a user interface, such that only objects featuring a certain criteria are displayed. As shown in FIG. 9, the user may choose whether or not to display objects related to an alarm extension reference, to an alarm state, or an operator override or user command, to inputs or outputs, or to only display objects with direct involvement with the AHU. For example, by de-selecting the inputs and outputs options, the user may remove all information related to inputs received at the AHU and outputs provided by the AHU to other systems, allowing the user to just view equipment. As another example, by selecting only the alarm options, the user may be able to easily view all alarms generated as a result of operation of the AHU. As another example, by only selecting the user command option, the user may more clearly see his or her options for changing the operation of the AHU.

As described with reference to FIGS. 5 and 8, object 902 is shown to include a list 904 of building spaces the object serves (B7) and a list 906 of network information of objects connected to object 902. List 906 is shown in top-down order, from the server (ADX-1), to the NAE, to the trunk (N2-2).

Some objects may be highlighted (922) in user interface 900. This is illustrated in FIG. 9 as a dashed line for the boxes, but the highlighting may include any change in color, shading, font size or color, or the like. In some embodiments, such as that shown in FIG. 9, highlighted objects may indicate a system component (e.g., a piece of equipment). In some embodiments, an indication of a number of references from a system, shown as 922, may be included in an object. In the example of FIG. 9, the reference 3 indicates that there are three components of the chiller system connected to the AHU object 902.

Figure 10:
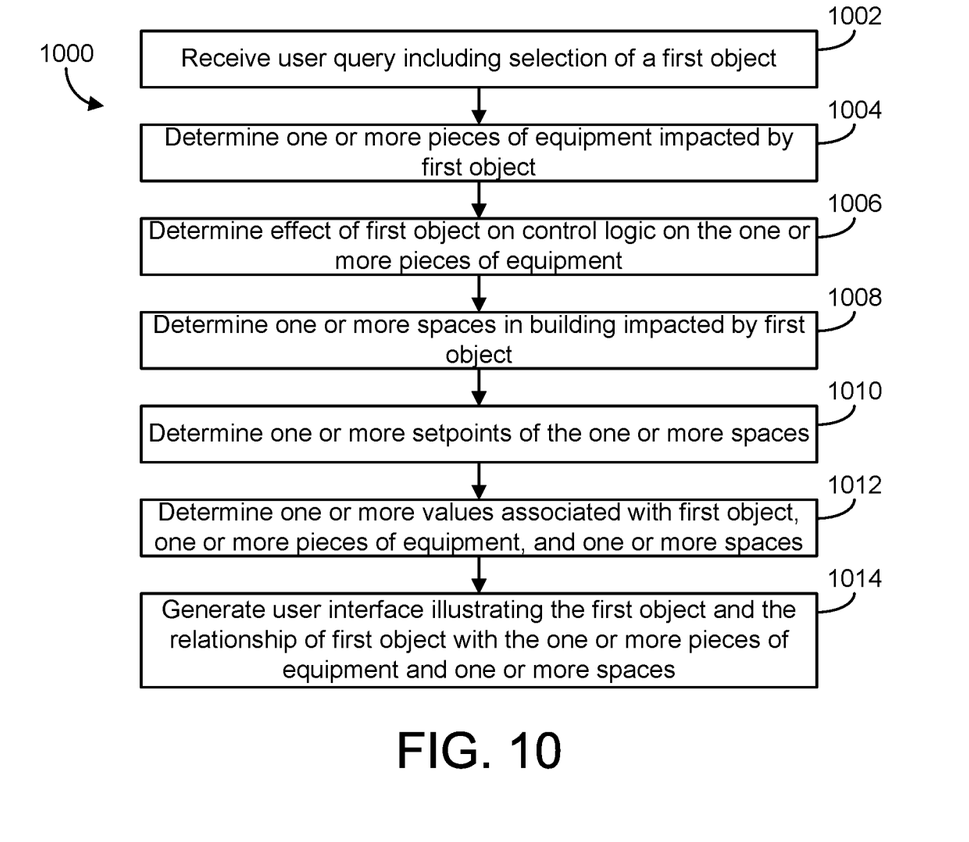
FIG. 10 is a flow chart of a process which can be performed by the BMS controller of FIG. 1 for generating an interactive user interface for a BMS, according to some embodiments.

Referring now to FIG. 10, a flow chart of a process 1000 for generating an interactive user interface to be displayed on a user device is shown, according to some embodiments. Process 1000 may be executed by, for example, user interface system 202. The user interface to be displayed on the user device may be configured to allow for the monitoring and controlling of building equipment and spaces in a BMS (e.g., BMS 100), and more particularly for viewing the impact of a component of the BMS on other components of the BMS.

Process 1000 includes receiving a user query including the selection of a first object (1002). The first object may be associated with one of a building system, a piece of equipment, or a space in the building. The selection may be an indication from a user that the user wishes to view the relationship between the object and other objects in a BMS.

Process 1000 includes determining one or more pieces of equipment impacted by the first object (1004). For example, if the first object represents a building space, 1004 may include identifying all equipment in the building space. If the first object represents a building subsystem, 1004 may include identifying all equipment part of the subsystem. If the first object represents a piece of equipment, 1004 may include identifying all equipment connected to the identified equipment.

Process 1000 includes determining an effect of the first object on control logic on the one or more pieces of equipment (1006). As described in the present disclosure, the subsystems and equipment of the BMS may be controlled by a high level control logic. 1006 may include identifying potential changes to the high level control logic to account for the behavior of the first object.

Process 1000 includes determining one or more building spaces impacted by the first object (1008). Process 1000 includes determining one or more setpoints of the one or more spaces (1010). The setpoints may include, for example, a condition that a piece of equipment or subsystem is supposed to maintain. For example, a setpoint may include a temperature setpoint for the space, lighting levels for the space, and the like.

Process 1000 includes determining one or more values associated with the first object, one or more pieces of equipment, and one or more spaces (1012). Values may include, for example, a current status of a piece of equipment or space, current environmental conditions in a space, a warning status for a piece of equipment or space, or parameters for the operation of a piece of equipment. The values may include "real-time" values of the current environment, or current settings associated with an equipment or space.

Process 1000 includes generating a user interface illustrating the first object and its relationship with the one or more equipment and spaces (1014). The relationship may be illustrated using, for example, by defining a control path between the equipment and spaces. Each equipment and space may be represented by an object in the user interface. The object may be a link, icon, button, or any other feature on the user interface that may be interacted with by a user. The user interface may further include the values determined at 1012. For example, values associated with a particular object may be displayed next to the object, allowing the user to view an impact of the first object on the values.

In some embodiments, the query received at 1002 may include a change in operation of the first object, or a change in a setpoint or value associated with the first object. The subsequent portions of process 100 may then further include determining an effect in control logic and setpoints that the change has.

In some implementations, the user may be provided with a schedule via the user interface. The schedule may relate to the implementation of control logic for a piece of equipment, or a schedule of setpoints for a building area. The user may be able to view adjustments in the schedule based on the impact that the first object has on the schedule.

(b) Configuration of Exemplary Embodiments

The construction and arrangement of the systems and methods as shown in the various exemplary embodiments are illustrative only. Although only a few embodiments have been described in detail in this disclosure, many modifications are possible (e.g., variations in sizes, dimensions, structures, shapes and proportions of the various elements, values of parameters, mounting arrangements, use of materials, colors, orientations, etc.). For example, the position of elements may be reversed or otherwise varied and the nature or number of discrete elements or positions may be altered or varied. Accordingly, all such modifications are intended to be included within the scope of the present disclosure. The order or sequence of any process or method steps may be varied or re-sequenced according to alternative embodiments. Other substitutions, modifications, changes, and omissions may be made in the design, operating conditions and arrangement of the exemplary embodiments without departing from the scope of the present disclosure.

The present disclosure contemplates methods, systems and program products on any machine-readable media for accomplishing various operations. The embodiments of the present disclosure may be implemented using existing computer processors, or by a special purpose computer processor for an appropriate system, incorporated for this or another purpose, or by a hardwired system. Embodiments within the scope of the present disclosure include program products comprising machine-readable media for carrying or having machine-executable instructions or data structures stored thereon. Such machine-readable media can be any available media that can be accessed by a general purpose or special purpose computer or other machine with a processor. By way of example, such machine-readable media can include RAM, ROM, EPROM, EEPROM, CD-ROM or other optical disk storage, magnetic disk storage or other magnetic storage devices, or any other medium which can be used to carry or store desired program code in the form of machine-executable instructions or data structures and which can be accessed by a general purpose or special purpose computer or other machine with a processor. Combinations of the above are also included within the scope of machine-readable media. Machine-executable instructions include, for example, instructions and data which cause a general purpose computer, special purpose computer, or special purpose processing machines to perform a certain function or group of functions.

Although the figures show a specific order of method steps, the order of the steps may differ from what is depicted. Also two or more steps may be performed concurrently or with partial concurrence. Such variation will depend on the software and hardware systems chosen and on designer choice. All such variations are within the scope of the disclosure. Likewise, software implementations could be accomplished with standard programming techniques with rule based logic and other logic to accomplish the various connection steps, processing steps, comparison steps and decision steps.

What is claimed is:

1. A building management system comprising:
    a user interface configured to display one or more user interfaces to facilitate at least one of monitoring or controlling at least one of (i) one or more building systems, (ii) one or more pieces of equipment, or (iii) one or more spaces of a building, the user interface comprising a graphical display; and
    one or more processing circuits comprising one or more memory devices coupled to one or more processors, the one or more memory devices configured to store instructions thereon that, when executed by the one or more processors, cause the one or more processors to:
        receive a selection of an object associated with one of a building system, a piece of equipment, or a space;
        determine at least one of (i) the one or more pieces of equipment related to the object or (ii) the one or more spaces related to the object;
        generate the graphical display illustrating aa relationship of the object with the at least one of (a) the one or more pieces of equipment related to the object or (b) the one or more spaces related to the object or (ii) a control path between the object and the at least one of (a) the one or more pieces of equipment related to the object or (b) the one or more spaces related to the object; and
        provide a graphical user interface menu with options to remove information from the graphical display relating to inputs or outputs associated with the object, operator overrides associated with the object, and alarms associated with the object.

2. The building management system of claim 1, wherein the one or more memory devices are further configured to store instructions thereon that, when executed by the one or more processors, cause the one or more processors to generate the graphical display illustrating the relationship of the object with the at least one of (a) the one or more pieces of equipment related to the object or (b) the one or more spaces related to the object.

3. The building management system of claim 1, wherein the one or more memory devices are further configured to store instructions thereon that, when executed by the one or more processors, cause the one or more processors to generate the graphical display illustrating the control path between the object and the at least one of (a) the one or more pieces of equipment related to the object or (b) the one or more spaces related to the object, the control path provides a control sequence that facilitates identifying how the object and the at least one of (a) the one or more pieces of equipment related to the object or (b) the one or more spaces related to object impact one another.

4. The building management system of claim 1, wherein the one or more memory devices are further configured to store instructions thereon that, when executed by the one or more processors, cause the one or more processors to generate the graphical display illustrating (i) the relationship of the object with the at least one of (a) the one or more pieces of equipment related to the object or (b) the one or more spaces related to the object and (ii) the control path between the object and the at least one of (a) the one or more pieces of equipment related to the object or (b) the one or more spaces related to the object.

5. The building management system of claim 1, wherein the one or more memory devices are further configured to store instructions thereon that, when executed by the one or more processors, cause the one or more processors to determine the one or more pieces of equipment related to the object and the one or more spaces related to the object.

6. A building management system for a building, the building management system comprising:
    one or more processing circuits comprising one or more memory devices coupled to one or more processors, the one or more memory devices configured to store instructions thereon that, when executed by the one or more processors, cause the one or more processors to:
        select an object associated with one of a building system, a piece of equipment, or a space of the building;
        determine one or more pieces of equipment related to the object;
        determine one or more spaces of the building related to the object; and
        generate a data set representative of (i) a relationship of the object with (a) the one or more pieces of equipment related to the object and (b) the one or more spaces related to the object and (ii) a control path between the object and (a) the one or more pieces of equipment related to the object and (b) the one or more spaces related to the object, the control path provides a control sequence that facilitates identifying how the object, the one or more pieces of equipment related to the object, and the one or more spaces related to object impact one another; and
        provide a graphical user interface menu with options to remove information from the data set relating to inputs or outputs associated with the object, operator overrides associated with the object, or alarms associated with the object.

7. The building management system of claim 6, wherein the one or more memory devices are further configured to store instructions thereon that, when executed by the one or more processors, cause the one or more processors to use the data set to least one of control or monitor the at least one of (i) the object, (ii) the one or more pieces of equipment related to the object, or (iii) the one or more spaces related to the object.

8. The building management system of claim 6, further comprising an external system coupled to the one or more processing circuits, wherein the one or more memory devices are further configured to store instructions thereon that, when executed by the one or more processors, cause the one or more processors to provide the data set to the external system, wherein the external system includes at least one of a user device or an application accessible with the user device through a network connected to the one or more processing circuits.

9. The building management system of claim 8, wherein the external system includes a display device configured to facilitate generating a graphical user interface on a display of the display device that illustrates the relationship and the control path based on the data set.

10. The building management system of claim 8, wherein the external system is configured to use the data set to least one of control or monitor the at least one of (i) the object, (ii) the one or more pieces of equipment related to the object, or (iii) the one or more spaces related to the object.

11. The building management system of claim 8, wherein the one or more memory devices are further configured to store instructions thereon that, when executed by the one or more processors, cause the one or more processors to:
receive an indication of a selection of the object from the external system; and
make the selection of the object based on the indication.

12. The building management system of claim 6, wherein the data set identifies all pieces of equipment connected with the object and all spaces of the building served by the object.

13. The building management system of claim 6, wherein the data set comprises a schedule related to a control strategy over time for the at least one of (i) the object, (ii) the one or more pieces of equipment related to the object, or (iii) the one or more spaces related to the object.

14. A management system comprising:
one or more processing circuits comprising one or more memory devices coupled to one or more processors, the one or more memory devices configured to store instructions thereon that, when executed by the one or more processors, cause the one or more processors to:
select an object associated with one of a building system, a piece of equipment, or a space of a building;
determine one or more pieces of equipment that are impacted by the object;
generate a data set that identifies a relationship of the object with the one or more pieces of equipment impacted by the object;
provide a graphical user interface menu with options to remove information from the data set relating to inputs or outputs associated with the object, operator overrides associated with the object, or alarms associated with the object.

15. The management system of claim 14, wherein the one or more memory devices are further configured to store instructions thereon that, when executed by the one or more processors, cause the one or more processors remove information from the data set relating to operator overrides associated with the object.

16. The management system of claim 14, wherein the one or more memory devices are further configured to store instructions thereon that, when executed by the one or more processors, cause the one or more processors to:
remove information from the data set relating to inputs or outputs associated with the object.

17. The management system of claim 16, wherein the one or more memory devices are further configured to store instructions thereon that, when executed by the one or more processors, cause the one or more processors to display options for changing operation of the object.

18. The management system of claim 14, wherein the one or more memory devices are further configured to store instructions thereon that, when executed by the one or more processors, cause the one or more processors to remove information from the data set that is not directly involved with the object.

19. The management system of claim 14, wherein the one or more memory devices are further configured to store instructions thereon that, when executed by the one or more processors, cause the one or more processors to:
receive an indication of a selection of the object from an external system connected to the one or more processing circuits; and
make the selection of the object based on the indication.

20. The management system of claim 19, further comprising the external system, wherein the external system is configured to use the data set to least one of control or monitor the at least one of the object or the one or more pieces of equipment impacted by the object, and wherein the external system includes at least one of a user device or an application accessible with the user device through a network connected to the one or more processing circuits.

* * * * *